US012730647B2

(12) United States Patent
Al Sheikh et al.

(10) Patent No.: US 12,730,647 B2
(45) Date of Patent: Sep. 8, 2026

(54) REGISTER ALLOCATION DECISION

(71) Applicant: Arm Limited, Cambridge (GB)

(72) Inventors: Rami Mohammad Al Sheikh, Morrisville, NC (US); Rodney Wayne Smith, Wake Forest, NC (US); Kiran Ravi Seth, Raleigh, NC (US); Michael David Achenbach, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/903,258

(22) Filed: Oct. 1, 2024

(65) Prior Publication Data

US 2026/0093495 A1 Apr. 2, 2026

(51) Int. Cl.
*G06F 9/30* (2018.01)
*G06F 9/38* (2018.01)

(52) U.S. Cl.
CPC .......... *G06F 9/384* (2013.01); *G06F 9/30112* (2013.01); *G06F 9/3858* (2023.08)

(58) Field of Classification Search
CPC ..... G06F 9/384; G06F 9/30112; G06F 9/3858
See application file for complete search history.

(56) References Cited

U.S. PATENT DOCUMENTS 5,446,912 A * 8/1995 Colwell ................ G06F 9/3836 712/E9.046
2013/0145127 A1 6/2013 Hardage et al.
2014/0129804 A1 5/2014 King
2015/0019843 A1* 1/2015 Krishna ................ G06F 9/3842 712/217
2017/0371654 A1* 12/2017 Bajic ..................... G06F 9/3888
2023/0305852 A1* 9/2023 Asanovic ............. G06F 9/3013
2024/0192959 A1 6/2024 Eyole

FOREIGN PATENT DOCUMENTS

CN 113961248 1/2022

OTHER PUBLICATIONS

Liu et al.; An Efficient Register Renaming Technique with Delayed Allocation and Register Packing; 2020; IEEE (Year: 2020).*
Combined Search and Examination Report for GB Application No. 2515033.5 dated Feb. 19, 2026, 7 pages.

* cited by examiner

*Primary Examiner* — Corey S Faherty
(74) *Attorney, Agent, or Firm* — NIXON & VANDERHYE P.C.

(57) ABSTRACT

An apparatus comprises execution circuitry configured to execute a given instruction to produce a given data value. Value analysis circuitry is configured to perform an analysis of the given data value produced by the execution circuitry to determine at least one property of the given data value, and register allocation circuitry is configured to make a register allocation decision regarding storage of the given data value in a physical register file in dependence on the analysis of the given data value.

17 Claims, 6 Drawing Sheets

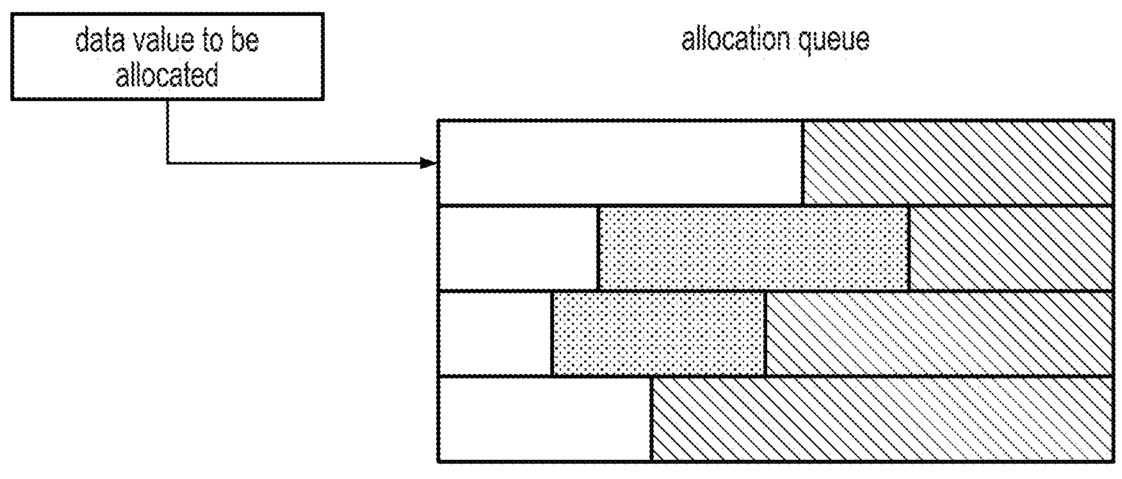
FIG. 4
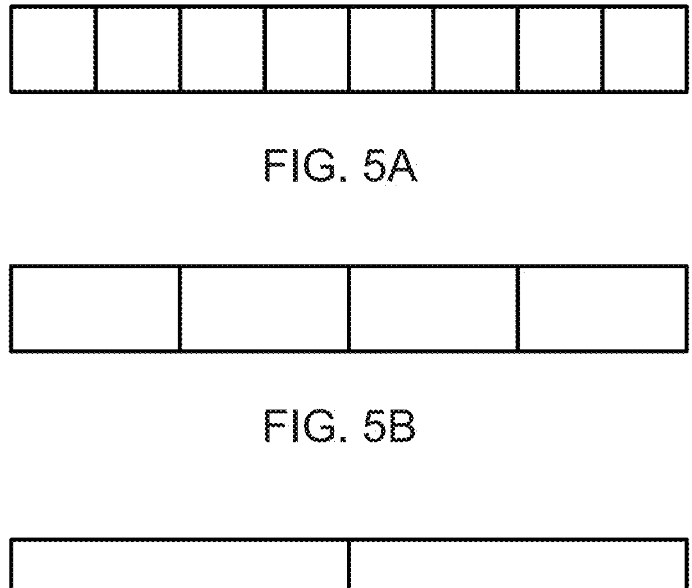
FIG. 5A
FIG. 5B
FIG. 5C

REGISTER ALLOCATION DECISION

BACKGROUND

Technical Field

The present technique relates to the field of data processing. In particular, the present technique relates to the use of physical registers to store data values.

Technical Background

Data processing devices may provide physical registers to store data values. Registers provide locations accessible to processing circuitry, which can be used for storing the inputs and/or outputs of processing operations. The registers for a particular processing operation may be identified by an instruction corresponding to that processing operation. Physical registers may represent a significant portion of the power and area cost associated with a processor.

SUMMARY

At least some examples of the present technique provide an apparatus, comprising:

execution circuitry configured to execute a given instruction to produce a given data value;

value analysis circuitry configured to perform an analysis of the given data value produced by the execution circuitry to determine at least one property of the given data value; and register allocation circuitry configured to make a register allocation decision regarding storage of the given data value in a physical register file in dependence on the analysis of the given data value.

At least some examples provide computer-readable code for fabrication of an apparatus, comprising:

execution circuitry configured to execute a given instruction to produce a given data value;

value analysis circuitry configured to perform an analysis of the given data value produced by the execution circuitry to determine at least one property of the given data value; and register allocation circuitry configured to make a register allocation decision regarding storage of the given data value in a physical register file in dependence on the analysis of the given data value. The computer-readable code may be stored on a computer-readable medium. The medium may be non-transitory.

At least some examples provide a method, comprising:

executing a given instruction to produce a given data value;

performing an analysis of the given data value to determine at least one property of the given data value; and making a register allocation decision regarding storage of the given data value in a physical register file in dependence on the analysis of the given data value.

Further aspects, features and advantages of the present technique will be apparent from the following description of examples, which is to be read in conjunction with the accompanying drawings.

BRIEF DESCRIPTION OF THE DRAWINGS

FIG. 4 illustrates a register allocation queue indicating availability of bits within a selection of allocated physical registers.

FIGS. 5A to 5C provide example encodings of register availability information.

DESCRIPTION OF EXAMPLES

Figure 1:
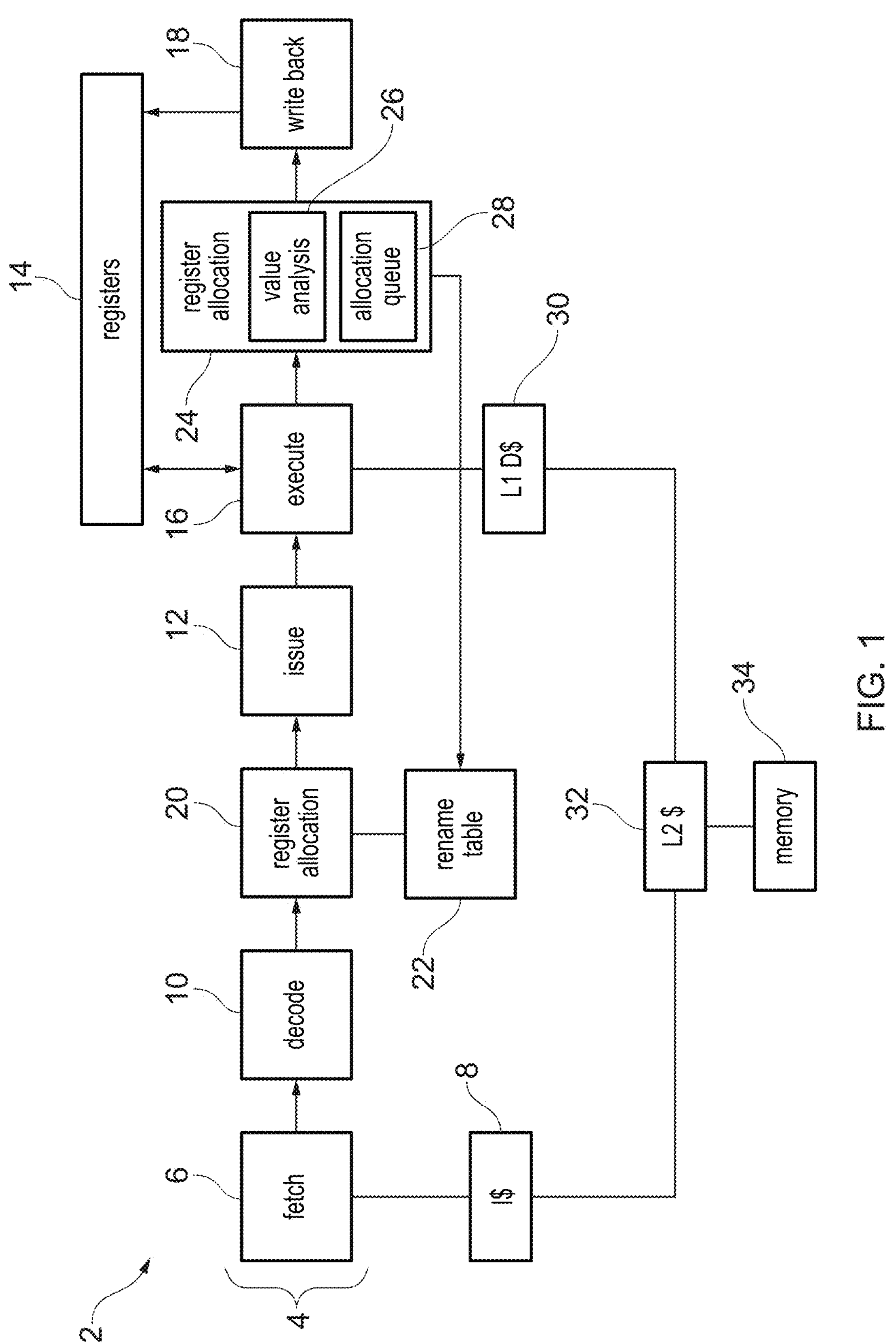
FIG. 1 schematically illustrates an example of a data processing apparatus comprising register allocation circuitry.

A data processing apparatus comprises execution circuitry configured to execute instructions. The execution circuitry is configured to execute a given instruction to produce a given data value. The given instruction and the given data value are not particularly limited. For example, the given instruction may comprise a load instruction configured to load the given data value from memory, the given instruction may comprise an arithmetic instruction configured to perform arithmetic operations on input values to produce the given data value, and so on.

The given data value may be stored so that it may be used as an input for a future instruction. The given instruction may for example specify a destination architectural register identifying a location for storing the given data value, so that the given data value can be provided as an input to future instructions specifying the same architectural register.

In some alternative techniques, there may be a one-to-one correspondence between architectural registers specified by instructions and physical registers, so that which physical register in a physical register file is used for a particular architectural register is fixed, and hence the selection of which physical register to store the given data value is indicated by the given instruction, and can be determined based on the encoding of the instruction alone.

In other alternative techniques, register renaming may be used to remove false dependencies between instructions referencing the same architectural registers but which are in fact independent from each other. In these examples physical registers may be allocated for a particular data value produced by an instruction by remapping the architectural registers specified by the instruction to different physical registers, in some examples via a two stage allocation process.

The inventors have however realised that existing techniques for allocating physical registers for storing data values produced by instructions may often lead to inefficient utilisation of the physical registers in the physical register file.

According to the techniques discussed herein, the apparatus provides value analysis circuitry configured to perform an analysis of the given data value produced by the execution circuitry to determine at least one property of the given data value, and register allocation circuitry configured to make a register allocation decision regarding storage of the given data value in a physical register file in dependence on the analysis of the given data value.

By making a decision about how to use the physical register file, when making a decision about storing the given data value, based on an analysis of the actual given data value produced by the execution circuitry, a more efficient utilisation of the physical register file can be obtained. For example, the register allocation decision may no longer be made purely on the basis of an instruction encoding which, although it may provide an indication about properties of a data value (such as a maximum size of that value), may not allow a determination of the actual properties of the given data value produced by the execution circuitry.

The at least one property is not particularly limited. In one example the value analysis circuitry may determine whether the given data value has a particular predetermined value, and make the register allocation decision in dependence on whether the given data value has the predetermined value. For example, if the given data value has a particular predetermined value then the given data value may be indicated using a mechanism which requires less use of the physical register file. For example, a register may not be allocated at all in the physical register file and the predetermined value may be indicated in some other way (such as in a rename table as discussed below). For example, if the given data value produced by the given instruction has the value zero, then this could be indicated in a more efficient way than allocating a physical register to store that value.

In some examples, the at least one property may comprise a width of the given data value. The width of the given data value may comprise a minimum number of bits required to represent the given data value produced by the execution circuitry, and the physical register allocation circuitry may be configured to make the register allocation decision in dependence on the width of the given data value.

Whilst the encoding of an instruction may give an indication about the maximum size for the given data value (e.g., the architectural register identifier may specify a particular size of destination register, such as 32 bits or 64 bits), this does not reflect how many bits are actually required to store the value produced by the execution circuitry. For example, the given data value may be represented in fewer bits than the maximum size indicated in the instruction encoding. By considering the width of the given data value when making a register allocation decision, a more efficient utilisation of the physical register file may be achieved.

For illustration, if the given instruction produces a value which may be up to 64 bits long, but an analysis of the given data value determines that it can be represented in 16 bits, then allocating a 64 bit register to store that value may result in 48 bits of that register being unused. As shown below, various examples may consider the width of the given data value to reduce inefficient utilisation of the register file.

The width of the given data value could be computed in various ways. In some examples, the value analysis circuitry may be configured to determine the width of the given data value based on a number of sign extension bits associated with the given data value. The execution circuitry may comprise a fixed number of output bits representing the given data value at a fixed size (e.g., 64 bits). When the width of the given data value is less than this fixed size, a number of sign extension bits may be appended to pad the most significant bits of the given data value up to the fixed size. For example, a positive value may have a number of zeroes appended as sign extension bits, and a negative number (in two's complement representation) may have a number of ones appended as sign extension bits. The sign extension bits do not contribute to the width of the data value as they do not affect how many bits are required to represent the given data value. The width of the given data value may be determined for example by counting how many bits, starting from a most significant end of the value, have the same value before a first bit is encountered having a different value and subtracting this number (the number of sign extension bits) from the total number of bits output by the execution circuitry.

In some examples, the register allocation circuitry may comprise a register rename table configured to store entries providing a mapping between a destination architectural register identifier specified by an instruction and a renamed register identifier. As discussed below, the renamed register identifier may identify a physical register, or may identify a virtual register if two-stage register renaming is used. Register renaming can remove false dependencies between instructions, where a false dependency may occur when different instructions identify the same architectural register to be used at different times in a program to hold different, unrelated, operands. By mapping the same architectural register to different renamed register identifiers this enables instructions referencing the same architectural register to be executed in an order other than the program order, which can allow performance to be improved by enabling parallel or out of order execution. To support register renaming, there may be a greater number of physical registers in the physical register file than architectural register identifiers.

A new renamed register identifier may be allocated for each destination architectural register identifier encountered in a series of instructions, and when the same register identifier is encountered as a source register identifiers in subsequent instructions then the entry can be used to identify which renamed register identifier should be used for obtaining the input data for the subsequent instruction.

In examples using a register rename table, in response to determining that the width of the given data value is below a given threshold, the register allocation circuitry may be configured to store the given data value in an entry of the rename table corresponding to a given destination architectural register specified by the given instruction and skip storing the given data value in the physical register file. That is, if the value analysis circuitry determines that the width of the given data value is low enough, then the given data value may be stored in the rename table itself (in an entry corresponding to the given destination architectural register of the given instruction) rather than using a physical register to store the given data value. This may be the case regardless of the potential size of the given data value (e.g., if it may have been up to 64 bits), as long as the actual size of the given data value is below the given threshold.

If the given data value is above the given threshold, then the register allocation circuitry may be configured to determine that the given data value should be stored in a physical register of the physical register file. Hence, the register allocation decision regarding storage of the given data value in the physical register file may be a decision of whether or not store the given data value in the physical register file at all, and whether to instead store the given data value in the rename table.

Storing data values in the rename table itself, if they are determined to be small enough, can significantly reduce register pressure because it can reduce the number of physical registers which may need to be allocated for a given set of instructions. This can increase the effective size of the physical register file and hence allow a given physical register file to be used for more instructions at once (and hence improve performance), and/or can allow the size of a physical register file to be decreased (to reduce power and area). In addition, register port pressure can be reduced by using the register rename table to store certain data values, because the given data value can be obtained by a future instruction without requiring the value to be written to or read from the physical register file and hence register read ports and write ports can be used for other accesses to enable improved performance.

The given threshold is not particularly limited. In some examples, the given threshold may equal the number of bits required to distinguish between a number of physical registers in the physical register file. For example, the given data value may be stored in a rename field of the register rename table provided for representing the renamed register identifier. This field may typically provide sufficient bits to distinguish between the physical registers in the physical register file, so that any of the physical register identifiers can be represented in the register rename table. For N physical registers, the number of bits required to distinguish between the physical registers may be log 2(N). For example, if there are 32 physical registers then the rename field could be a 5 bit field to enable any physical register to be identified as the renamed register identifier for a particular architectural register. If the given threshold is the same number of bits as required to distinguish between the physical registers, then the given data value may be represented in the register rename table with reduced modification, because the same size of field that would usually be provided for holding the renamed register identifier can be reused (without any additional bits) for storing the given data value. Hence, rather than recording an M bit physical register identifier in the register rename table and allocating a physical register to store the given data value, those M bits could be used to store the given data value itself for a more efficient storage.

However, in other examples, the given threshold may be greater than a number of bits required to distinguish between a number of physical registers in the physical register file. Hence, the register rename table may be configured to provide a greater number of bits in the rename field than required to distinguish between a number of physical registers in the physical register file. The inventors have realised that, although providing a threshold greater than the number of bits which may typically be stored in a register rename table may require the rename table to be modified to store more bits, the significant benefits of storing the given data value in the rename table can outweigh slightly increasing the storage requirements of the register rename table.

Other elements of the apparatus may also be configured to support storing a given data value larger than log 2(N) in the rename table. For example, a path may be provided between the execution circuitry and the register rename table to enable the given data value to be written to the register rename table, and this path could be configured to support greater than log 2(N) bits.

In some examples, the register allocation circuitry may be configured to indicate a virtual register identifier as the renamed register identifier for a given destination architectural register specified by the given instruction in advance of the given data value being produced by the execution circuitry. Virtual register identifiers may be used in a two-stage register allocation process, where an architectural register may be mapped to a virtual register identifier at a first stage in the processing pipeline, and the virtual register identifier may be mapped to a physical register identifier at a later stage in the pipeline. For example, the virtual register identifier may be mapped to a physical register identifier only once a data value has been produced by the execution circuitry. This late physical register allocation can reduce the time that a physical register is allocated for a particular data value (because the physical register is not allocated until the value has actually been produced), which can increase the effective size of the physical register file, whilst remapping architectural registers to virtual register identifiers at an earlier stage of the pipeline can allow out-of-order processing to still be performed.

In examples of the present technique using virtual register identifiers, the register allocation circuitry may be responsive to a determination that the width of the given value is below the given threshold to replace the virtual register identifier in the register rename table with the given data value. Hence, the destination architectural register may be mapped to a virtual register identifier at a first stage in the pipeline, and once the given data value is produced and determined to be below the given threshold, the virtual register identifier may be replaced with the given data value. In such examples, a physical register is not allocated for the given data value at any point, allowing the effective size of the physical register file to be increased.

The register allocation circuitry may also be configured to replace the virtual register identifier with a physical register identifier in response to determining that the given data value has a width greater than the given threshold, and hence allocate a physical register for storing the given data value at the stage it is determined (based on the width of the given data value) that a physical register should be allocated to store the given data value.

In some examples, if is determined that the given data value can be stored in the register rename table, the register allocation circuitry may be configured to broadcast the given data value to at least one pending instruction via a communication channel. Pending instructions may comprise, for example, instructions in the out of order window which have passed the rename stage of the pipeline and hence would not be able to get the data value from the rename table. Such a communication channel may be provided in some examples using late register allocation to enable the virtual register identifier to be updated to indicate a physical register identifier. In the present technique, the communication channel may be configured to support values having a greater number of bits than required to distinguish between a number of physical registers in the physical register file. As with the rename table, modifications to allow the given data value to be larger than a physical register identifier may allow performance to be increased.

In some examples, the register allocation circuitry may be configured to allocate a given physical register for the given data value in advance of the given data value being produced by the execution circuitry. Hence, some examples may not use late register allocation as discussed above, hence not using virtual register identifiers, and instead allocate a physical register when allocating a renamed register identifier for a particular destination architectural register (in which case the renamed register identifier is a physical register identifier).

When allocating physical registers at the rename stage (before the given data value is produced), it is not yet known whether the given data value will have a width above or below the given threshold. Hence, a physical register may be speculatively allocated (e.g., removed from the free list and indicated in the rename table) for storing that given data value. After the given data value has been produced, the register allocation circuitry may be responsive to a determination that the width of the given data value is below the given threshold to release the given physical register, and to store the given data value in the register rename table and skip storing the given data value in the allocated physical register. Releasing the given physical register may comprise making that physical register available for storing other data values. For example, releasing the given physical register may comprise adding the physical register to a free list indicating registers which are available for allocation.

In examples in which the given data value is stored in the register rename table, responsive to a subsequent instruction later in program order than the given instruction, the subsequent instruction specifying a source architectural register which corresponds to the given destination architectural register, the register allocation circuitry may be configured to provide the given data value from the rename table to the execution circuitry for executing the subsequent instruction. Hence, when the given data value is to be used as an input in a subsequent instruction, then the given data value may be passed down the processing pipeline as an immediate with the instruction, allowing the given data value to be accessed by the execution circuitry without requiring an access to the physical register file. A source architectural register may correspond to the given destination architectural register if it matches the given destination architectural register and, for example, there are no intervening instructions specifying the same destination architectural register.

In some examples, the register rename table may also be used to store an immediate specified by an instruction. For example, the instruction encoding may directly specify a value to be used in processing. Rather than allocating a physical register to store the immediate value, the immediate may be stored in the register rename table (e.g., if it is below a threshold size). However, it will be appreciated that the immediate value is a value specified by the encoding of an instruction and is not a value produced by the execution circuitry, and is hence not subject to analysis by the value analysis circuitry.

Whilst the decision of whether or not to use the physical register file to store the given data value may be one register allocation decision made by the register allocation circuitry, the present techniques are not so limited, and other register allocation decisions may be made in dependence on the analysis of the given data value.

For example, in some examples the register allocation circuitry may be configured to determine, based on the width of the given data value determined by the value analysis circuitry, whether to allocate the given data value to a physical register in combination with at least one further data value. Hence, if it is determined that the given data value should be stored in a physical register of the physical register file, the width of the given data value may be used to determine whether the physical register may be shared so that it can be used to store a plurality of data values.

The value analysis circuitry may for example determine that the given data value can be represented using fewer bits than provided by a physical register. The register allocation circuitry may therefore choose to allocate the same physical register to store the given data value and at least one further data value, as long as the total width of the values taken together is less than or equal to the size of the physical register. This technique can in theory be applied to any data values which have a width less than the size of the physical register, although as discussed below in some examples the combinations of widths which may be combined in a physical register may be more limited.

Combining two or more data values in one physical register can enable register pressure to be reduced, because rather than requiring a one-to-one mapping between data values and physical registers, a many-to-one relationship can be established. Whenever a workload uses data values less than the full size of a physical register (and particularly when the workload uses smaller data values, such as data values smaller than half of the size of a physical register) the number of physical registers required for that workload can be significantly decreased. This can increase the effective size of the physical register file. In some examples this can also reduce the number of times the physical register file needs to be accessed and hence can also reduce register port pressure.

The register allocation circuitry may decide how to combine data values in physical registers in various ways. In some examples, the apparatus may comprise at least one register allocation queue comprising a plurality of register allocation entries, a given register allocation entry indicating available bits within a set of one or more values allocated to a particular physical register. The register allocation circuitry may be configured to compare the width of the given data value to the given register allocation entry to determine whether the given data value can be allocated to the particular physical register in combination with the set of one or more values.

Hence, the register allocation queue may track recently allocated physical registers and may indicate whether those physical registers contain any unused bits not used for representing the data values already allocated to those registers. The register allocation circuitry, having access to the width of the given data value, can compare that width to the entries of the register allocation queue to determine if the given data value fits in any of the physical registers identified in the register allocation queue. If so, then the given data value may be allocated to the corresponding physical register in combination with the value(s) already stored in that physical register (and the register allocation queue updated to reflect the reduced number of available bits in the corresponding physical register). If the given data value does not fit in any of the physical registers in the register allocation queue, then a new physical register may be allocated to store the given data value and a new entry may be allocated to the register allocation queue to indicate any remaining bits in that new register left over once the given data value has been stored to that physical register. Entries may be removed from the register allocation queue if it is determined that they do not have sufficient remaining space, for example.

The use of the register allocation queue may be used in combination with late register allocation, as discussed above, and hence a virtual register identifier allocated to a particular architectural register may be updated once the given data value has been produced, to represent in which physical register the given data value is stored. Unlike conventional register allocation, because two or more data values may be stored in the same physical register, the register rename table may also indicate where the given data value is stored in a particular physical register.

The register allocation queue provides an effective mechanism for combining storage of data values in the same physical register. One alternative mechanism could be to compare the size of the data value produced by a given instruction with the size of data values produced by neighbouring instructions to determine if the data values may be stored together. In comparison to this technique, the register allocation queue enables data values from non-consecutive instructions to be combined without requiring a large number of comparators to be provided in the processing pipeline.

If the given data value can be stored in one of a selection of physical registers in the register allocation queue, then the decision about which physical register to use for storing the given data value could be made in various ways. In some examples, the physical register may be selected to favour combination of the given data value with data values produced by instructions nearby in program order. For example, the register allocation queue may indicate the instruction IDs of the instructions which produced the data values stored in each physical register, and the instruction IDs may be used to determine which registers store data values produced by nearby instructions in program order. Favouring combination of data values produced by nearby instructions can allow physical registers to be reclaimed more easily.

The register allocation queue may identify available bits in physical registers in various ways. In some examples, at least one register allocation entry may be configured to provide a bit vector indicating available bits within the particular physical register. Each bit of the bit vector may correspond to a portion of the physical register at a particular granularity, and indicate whether that portion of the physical register is available to store a data value.

The granularity of the bit vector may vary in different implementations. For example, a simple implementation may provide two bits, each corresponding to half of a physical register and indicating whether that half of the physical register is available to store a data value. This simple implementation may enable up to two values to be stored in each physical register. Alternatively, the bit vector may be provided at a finer granularity, for example representing availability of each quarter, eighth, etc. of the physical register. A finer granularity may require a greater number of bits to be provided in the register allocation queue, but can allow more data values to be combined for each physical register.

In some examples, the register allocation circuitry may be configured to allocate arbitrary combinations of data value widths to physical registers. For example, a given 64 bit physical register could be used to store two 32 bit values, a 48 bit value and a 16 bit value, four 16 bit values, and so on. Enabling arbitrary combinations of data widths to be combined in a particular physical register increases the flexibility with which data values can be stored in the physical register file and can allow the physical register file to be utilised more efficiently.

In some examples, the register allocation circuitry may be configured to allocate at least one data value to a physical register in combination with two or more further data values. Hence, a given physical register may be used to store three or more separate data values, which may provide a particularly efficient utilisation of the physical register file.

Certain instructions for producing data values may indicate a maximum size of the data value based on a register identifier. For example, an instruction may specify a destination architectural register using a register identifier supporting up to a first maximum size or supporting up to a second maximum size. In previous techniques, allocation of a physical register having the size represented by a particular instruction may be required in case the data value produced by the given instruction does have the maximum size. However, according to examples of the present technique, the register allocation circuitry may be configured to permit the given data value to be allocated to a physical register in combination with a data value produced by an instruction capable of outputting a value having the same width as the physical register. Hence, even if an instruction is capable of outputting a value having the same width as the physical register, if the actual value produced by the execution circuitry is found to not be the size of the physical register then a physical register may be allocated to store that value in combination with another data value. This would not be possible if registers were allocated merely on the basis of the instruction encoding, but by providing the value analysis circuitry a more efficient register utilisation can be achieved.

Particular examples will now be discussed with reference to the Figures.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate decoded instructions to be processed by remaining stages of the pipeline; a rename stage comprising register allocation circuitry 20 to maintain a speculative mapping between a set of architecturally defined registers and a plurality of physical registers provided in a physical register file 14; an issue stage 12 for checking whether operands required for decoded instructions are available in the register file 14 and issuing instructions for execution once the required operands for a given instruction are available; an execute stage 16 for executing data processing operations corresponding to the instructions, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages.

The execute stage 16 may include a number of processing units, for executing different classes of processing operation. For example the execution units may include an arithmetic/logic unit (ALU) for performing arithmetic or logical operations; a floating-point unit for performing operations on floating-point values, a branch unit for evaluating the outcome of branch operations and adjusting the program counter which represents the current point of execution accordingly; and a load/store unit for performing load/store operations to access data in a memory system 8, 30, 32, 34. In this example the memory system include a level one data cache 30, the level one instruction cache 8, a shared level two cache 32 and main system memory 34. It will be appreciated that this is just one example of a possible memory hierarchy and other arrangements of caches can be provided. The specific types of processing unit shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness, such as branch prediction mechanisms or address translation or memory management mechanisms.

The instructions processed by the pipeline 4 specify input and output operands using architectural register identifiers to indicate which data should be processed by those instructions and where the result should be stored. In some implementations, each architectural register identifier may correspond to a particular physical register in the physical register file 14, and hence a rename stage may not be provided.

However, when there is a one-to-one mapping between architectural registers and physical registers then the program may need to be executed in order, because there may be false dependencies between instructions which reference the same architectural register but are in fact unrelated, and executing these instructions out of order may lead to incorrect processing results. Register allocation circuitry 20, 24 may be provided to remap architectural register identifiers to allow processing to be performed out of order.

Figure 2:
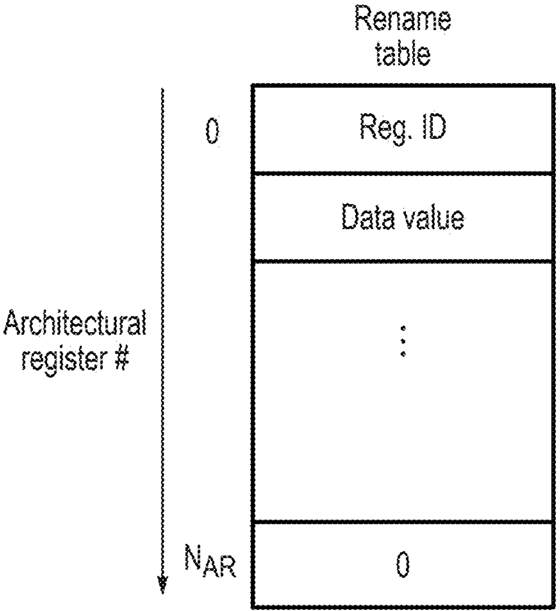
FIG. 2 illustrates an example register rename table.

The pipeline 4 shown in FIG. 1 comprises two stages of register allocation circuitry 20, 24. The first stage of register allocation circuitry 20 remaps architectural register identifiers specified by instructions to remapped register identifiers, which may be either virtual register identifiers (if late register allocation is used) or physical register identifiers. The register allocation circuitry 20 has access to a rename table 22, as illustrated in FIG. 2.

The rename table 22 represents the current speculative architectural-to-renamed register mappings which are active at an allocation point representing the most recent decoded instruction which has been renamed speculatively. The mappings in the rename table 22 are used for controlling the register mappings that are assigned to speculatively executed micro operations that are generated from the decoded instructions. The rename table may be provided as a table indexed by architectural register number, where each entry specifies the corresponding renamed register number which is mapped to that architectural register number, although a tagged structure could also be used in which the corresponding to a particular architectural register may be identified by a tag field.

The rename table 22 may be provided as a speculative rename table (SRT), in comparison to an architectural rename table (ART) which is not shown in FIG. 1. The ART may also be provided to represent the non-speculative architectural-to-renamed register mappings which were current at the time of processing a decoded instruction at the commit point, which is the last decoded instruction which is known to have been correctly executed. Whilst the SRT may be used for assigning mappings to decoded instructions, the ART may act as a backup in case previous mappings need to be restored to handle a misprediction. The ART may have the same format as the SRT.

Figure 3:
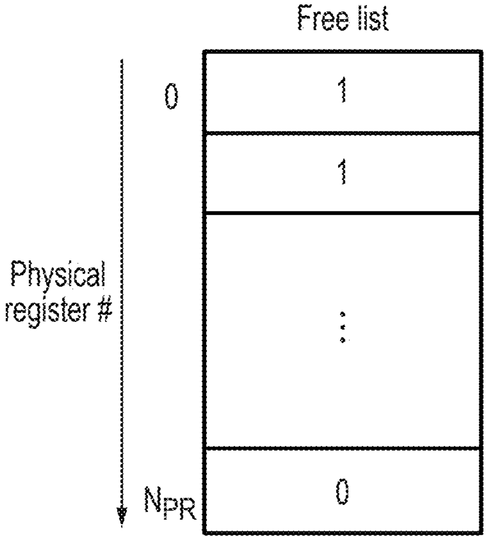
FIG. 3 illustrates a register free list.

Although not shown in FIG. 1, the register allocation circuitry 20, 24 may also have access to a free list. The free list, shown in FIG. 3, identifies physical registers that are currently protected against reallocation, for example, because they are already mapped to an architectural register. The free list may be indexed by the physical register number and contains a field (e.g. a single bit) indicative of whether the corresponding physical register is currently free for allocation or is protected against reallocation. In the illustrated example, physical registers 0 and 1 each have a value of 1 indicating that they are free to be allocated. On the other hand, physical register $N_{PR}$ has a value of 0 indicating that it is protected and, hence, is not available for reallocation. It would be readily apparent to the skilled person that, in alternative configurations, a logical 0 could be used to indicate that the physical register is free for allocation and a logical 1 could be used to indicate that the physical register is protected against allocation. A free list may also be provided to track available virtual registers in examples using two-stage register allocation.

When a given decoded instruction reaches the rename stage, a new architectural-to-renamed register mapping is generated by the register allocation circuitry 20 for each destination architectural register required by that decoded instruction. Most decoded instructions may specify only a single destination register, but there could be some decoded instructions that may specify more than one architectural register as a destination register. The destination register is a register to be written to in response to the decoded instructions, as opposed to source registers which provide operands for being processed by the decoded instruction to determine the result to be written to the destination register. Hence, for each destination architectural register specified by the decoded instruction, the register allocation circuitry 20 selects an available virtual register or physical register which is identified in the free list as being available for allocation, and writes the renamed register number of the selected renamed register to the entry of the rename table which corresponds to the architectural destination register specified by the instruction.

When instructions reach the rename stage, an architectural-to-renamed register mapping is applied to each source architectural register specified by that decoded instruction using the rename table 22. Therefore, instructions which take a particular register value as an input operands refer to the same renamed register as preceding instructions producing the values (as output operands) to be used as the input operand, and hence correct operation of the program is maintained.

When an architectural register corresponding to an entry of the rename table is encountered again as another destination register in a subsequent instruction in a program, a new renamed register identifier is assigned to that architectural register (invalidating the previous entry of the rename table) and used as the source register for subsequently encountered instructions specifying that architectural register. This means that different renamed registers are used for the same architectural register at different points in a program, which allows those different parts of the program to be executed in parallel or out of order.

The processing pipeline 4 also comprises register allocation circuitry 24 after the execute stage 16. The late register allocation circuitry 24 can be used as part of a two stage register allocation process. At the first register allocation stage 20, a destination architectural register for storing a given value produced by a given instruction may be mapped to a virtual register, and once the given value has been produced by the execute stage 16 the virtual register may be mapped to a physical register provided by the physical register file 14. This late register allocation process can increase the effective size of the physical register file 14 because the physical registers are only allocated when they are actually needed to store a data value, and are therefore each allocated (and hence unavailable for use by other instructions) for less time.

The register allocation circuitry 24 also comprises value analysis circuitry 26 configured to perform an analysis on data values produced by the execute stage 16. In an illustrative example, the value analysis circuitry determines the width of the given data value, the width comprising a number of bits required to represent the given data value.

In the examples described herein, the "given data value" is not necessarily a single numerical value, and hence may more generally refer to a set of one or more values which are treated together. For example, a single architectural register identifier may be used to refer to the given data value in an instruction encoding, and the given data value may correspond to a single instruction operand. The given data value could also be referred to as a data item or data structure.

The register allocation circuitry 24 makes a register allocation decision regarding storage of the given data value in the physical register file 14 in dependence on the analysis of the given data value.

For example, if the given value is determined to have a width below a given threshold, then the register allocation circuitry 24 may decide that the given data value is not to be stored in the physical register file 14 at all, and is instead to be stored in the rename table 22. For example, as shown in FIG. 2, an entry of the rename table corresponding to a given destination architectural register specified by the given instruction may be updated to indicate the given data value itself. The given data value can therefore be passed as an immediate down the pipeline with subsequent instructions which specify the architectural register as a source register and reach the rename stage after the given data value has been stored to the rename table 22.

When the rename table 22 is updated to indicate the given data value, the given data value may also be broadcast to instructions which have already passed the rename stage and have been assigned a renamed register identifier corresponding to the given architectural register.

If the register allocation circuitry 24 performs a late register allocation, then the use of the rename table to store certain data values can remove the requirement to allocate physical registers at all for those data values, as a virtual register may be assigned at the rename stage 20 and the virtual register may be replaced with the given data value at the late allocation stage 24. Alternatively, if physical registers are allocated at the rename stage 20 then deciding once the data value has been produced not to use the allocated physical register to store the given data value allows the physical register to be added back to the free list, making the physical register available earlier and hence increasing the effective size of the physical register file.

By storing the given data value in the rename table 22 instead of the physical register file 14, register pressure can be reduced because fewer physical registers are required to store data for a given set of instructions, and register port pressure can be reduced because certain data values may be obtained from the rename table 22 without being written to or read from the physical register file 14.

The size of the given threshold may vary in different implementations. The given threshold may be selected to be the same size as the renamed register identifier so that the same number of bits in the rename table can be used to store the given data value or indicate the renamed register identifier, and hence this technique may require minimal modification of the rename table. In other examples, the given threshold may be selected to be larger than the renamed register identifier, as the benefits of storing certain data values in the rename table may outweigh the additional storage requirements which may be associated with increasing the size of the rename table to accommodate larger data values.

If the given data value is larger than the threshold and therefore is to be stored in a physical register, the register allocation circuitry 24 may also determine whether to combine two or more data values in the same physical register. For example, the allocation circuitry 24 may provide an allocation queue 28 tracking, at some granularity, which bits of recently allocated physical registers remain unused. If a previously allocated physical register has some unused bits, and the given data value requires that number or fewer bits, then the given data value may be stored in the same physical register as one or more other data values to enable a more efficient packing of data values in the physical registers.

The allocation queue 28 (which may be provided as a FIFO) may for example provide a number of entries, each corresponding to a physical register, indicating which bits are available in that physical register. When a data value is produced, the register allocation circuitry 24 may compare the width of the given data value to the entries of the allocation queue 28 to determine if the given data value fits in any of the previously allocated physical registers. If so, the corresponding entry of the allocation queue 28 may be updated to record which bits are available following allocation of the given data value to that physical register (and, if relevant, the entry may be removed from the allocation queue). If no physical registers have space to store the given data value, then a new physical register may be allocated to store the given data value and (if any bits are remaining) the newly allocated physical register may be added to the allocation queue.

The allocation queue may also indicate which instructions have produced the data values allocated to a particular physical register. The register allocation circuitry 24 may select which of a set of physical registers having sufficient space to allocate to store a particular given data value in dependence on which instructions produced the data values also allocated those physical registers. Allocating nearby instructions to the same physical register can for example make it easier to reclaim physical registers, as each of the data values in a physical register may become unnecessary at a similar time.

FIG. 4 provides a logical illustration of the information which may be represented in an allocation queue. FIG. 4 illustrates four allocation queue entries, each corresponding to a different physical register, indicating which bits of that register are currently used to store data (produced by an earlier instruction). In FIG. 4, white is used to illustrate available bits of each register. As shown in FIG. 4, in some examples physical registers may be used to store three or more data values, and hence some physical registers are shown already storing two data values (indicated with different shading) whilst remaining in the allocation queue enabling a third data value to be stored in that register.

The value analysis circuitry 26 determines the number of bits required to store the given data value produced by the execution circuitry 16, and this width is compared to entries of the allocation queue to determine which, if any, entries can be used to store the given data value as shown in FIG. 4.

It will be appreciated that information in the allocation queue 28 representing availability of bits within physical registers may be provided in various ways. In one example, a value could be provided indicating a number of remaining bits in a particular physical register.

In other examples, a bit vector may be provided indicating, for each portion of a physical register, whether than portion is currently available to store the given data value. FIGS. 5A, 5B, and 5C provide example encodings of such a bit vector at different granularities. FIG. 5A provides a field for each eighth of the physical register indicating whether that portion is available, and hence FIG. 5A provides an example of an 8-bit vector which may be provided within entries of the allocation queue 28 to represent availability of bits within a physical register. For example, if the physical register is 64 bits then each bit of the vector shown in FIG. 5A may indicate the availability of an 8 bit portion of the physical register. It will be appreciated that a given data value may correspond to two or more portions of the bit vector, and may not completely fill the respective portion of the physical register. For example, a 14 bit value may be represented by setting two bits of the 8-bit vector to indicate that the corresponding portions of the physical register are no longer available (with, for example, one 8 bit portion completely used and 6 bits of a further 8 bit portion used).

FIG. 5B illustrates a 4-bit vector and FIG. 5C represents a 2-bit vector representing availability of bits of a physical register at coarser granularities. Coarser granularities may allow the bit vector to be represented in the allocation queue with fewer bits, and hence reduce storage requirements, although at the cost of enabling a potentially less efficient packing. For example, a 2 bit vector may allow a maximum of two data value to be stored in a given physical register, while a 4 bit vector may allow up to four (smaller) values to be stored in the physical register.

After part of a given physical register has been allocated to store a given data value, the rename table 22 may be updated to replace a virtual register assigned to the destination architectural register identifier of the given instruction with the identifier of the allocated physical register and a further item of information indicating which bits of that physical register store the given data value. The information identifying the location of the given data value in the allocated physical register could also be provided as a bit vector as shown in FIGS. 5A to 5C, although it will be appreciated that the same information may be encoded in different ways. If provided as a bit vector, then the bits corresponding to portions storing the given data value may indicate a particular value (e.g., "1") while the bits corresponding to other portions of the physical register may indicate a different value (e.g., "0").

If the given data value is smaller than the total number of bits provided in the portions of a physical register allocated to store the given data value, then the given data value may be sign extended to pad the given data value up to the size of the allocated portions. For example, if a particular 64 bit physical register is treated as having two 32 bit portions, then a 24-bit value may be extended up to 32 bits (by adding 8 sign extension bits) to fill the allocated portion of the physical register.

Some techniques may enable two data values to be combined in a particular physical register based on the instruction encoding alone, if the maximum size of those values is determined to allow those values to be combined in one physical register. For example, a particular architecture may provide instructions which specify architectural register identifiers having a maximum data value size. For instance, a particular instruction may specify a particular 32 bit destination register identifier (which may be referred to as a W register) while a separate instruction may specify a 64 bit destination register identifier (which may be referred to as an X register), in each case the output value not exceeding the size of the specified register. If a particular apparatus provides 64 bit physical registers, then two data values produced by instructions specifying W registers could be combined in a physical register even without analysing the actual size of the data values produced, as those values may fit in the 64 bit physical register even if they each require the full 32 bits. Whilst combining data values in physical registers based on the instruction encoding may allow a more efficient register allocation, it may still not allow as efficient a register allocation as can be achieved using the value analysis circuitry 26. In particular, combining data values based on the register identifier does not allow combinations of values which could theoretically have a combined size greater than the size of a physical register (even if the actual values produced would be able to be combined in a physical register). For example, for a 64 bit register, values corresponding to X registers (up to 64 bits) would not be able to be combined with values corresponding to W registers (up to 32 bits) or other X registers, as the number of bits required to store those values may exceed the total number of bits provided by the physical register (and without the value analysis circuitry it is not known whether this is the case or not).

Using the value analysis circuitry 26 however enables data values produced by instructions specifying an X destination register to be combined with data values produced by other instructions (e.g., values produced by an instructions specifying an X destination register can be stored in the same physical register as other values produced by instructions specifying X registers, or W registers). The value analysis circuitry can enable the actual width of the data values to be determined, rather than just their theoretical maximum size (as indicated by the type of register identifier in an instruction encoding).

Figure 6:
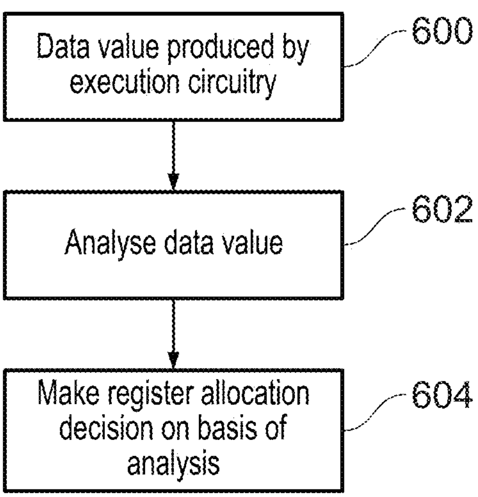
FIG. 6 is a flow diagram illustrating a method of making a register allocation decision.

FIG. 6 is a flow diagram illustrating a method according to the present techniques. At step 600, a given data value is produced by execution circuitry 16 executing a given instruction specifying a particular destination architectural register. At step 602, value analysis circuitry 26 performs an analysis on the given data value to determine at least one property, such as the width of the given data value or whether the given data value is a particular predetermined value.

At step 604, register allocation circuitry 20, 24 makes a register allocation decision regarding storage of the given data value in the physical register file 14 in dependence on the analysis. For example, the register allocation circuitry may determine whether or not to store the given data value in the physical register file, and if it is decided to store the given data value in the physical register file the register allocation circuitry may determine whether to combine the given data value with at least one further value in a physical register on the basis of the analysis.

Figure 7:
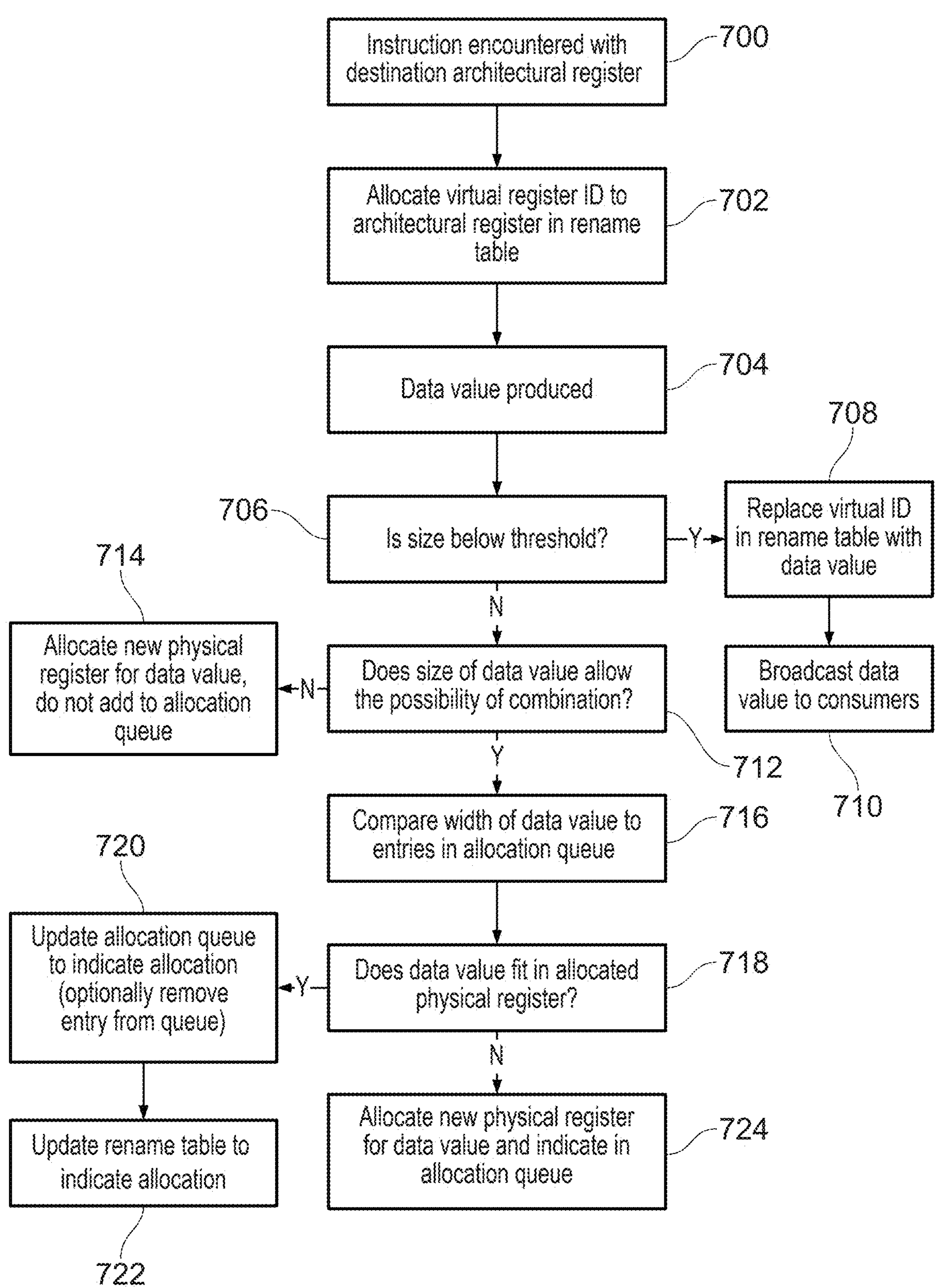
FIG. 7 is a flow diagram illustrating a particular method of making a register allocation decision based on a width of a given data value.

FIG. 7 is a flow diagram illustrating a particular example method for making a register allocation decision based on an analysis of a given data value produced by execution circuitry 16. The example of FIG. 7 makes register allocation decision on the basis of the width of the given data value, and uses late register allocation.

At step 700, a given instruction specifying at least one destination architectural register is fetched and decoded.

At step 702, the instruction reaches the rename stage and a new mapping is generated in the rename table 22 mapping the destination architectural register to a virtual register identifier. If the same architectural register was previously mapped to a (different) virtual register identifier, this previous mapping is invalidated (or overwritten) so that future consumer instructions, which specify the destination architectural register as a source register, use the new mapping and hence obtain the correct source data.

If further instructions specifying the same architectural register as a source register reach the rename stage at this point, the rename table 22 is looked up to determine the mapping from architectural to virtual register identifiers, and the instructions are passed down the pipeline specifying the virtual register most recently mapped to the architectural register.

At step 704 the given instruction is executed and a given data value is produced by the execute circuitry 16. The given data value may be produced in various ways, such as by loading the given data value from memory (using a load/store unit, where it is noted that the given data value could be an instruction), calculating the given data value using an arithmetic logic unit, and so on. The given data value is analysed by value analysis circuitry 26 to determine how many bits are required to represent the given data value.

At step 706, it is determined whether the number of bits required to represent the given data value is below a given threshold. If so, then it is determined that the given data value may be stored in the register rename table 22 rather than in the physical register file 14. Therefore, at step 708 the virtual register identifier in the register rename table, in an entry corresponding to the destination architectural register specified by the given instruction, is replaced with the given data value. Hence, any future instructions specifying the same architectural register as a source register while the entry is valid can obtain the given data value from the rename table, and carry the given data value down the pipeline 4 to the execution circuitry 16 as an immediate, without requiring a register access.

At step 710 the given data value is also broadcast to any consumer instructions which have already passed the rename stage and hence specify the virtual register identifier. These instructions may replace the virtual register identifier with the given data value, to be used for execution, again without accessing the physical register file 14.

If at step 706 it is instead determined that the number of bits required to represent the given data value exceeds the given threshold, then it is determined that the given data value should be stored in the physical register file 14.

At step 712, it is determined whether the size of the given data value allows the given data value to be theoretically combined in a physical register with another data value. For example, it may be determined whether the given data value is below a second threshold, higher than the given threshold of step 706. In some examples, the physical registers may be considered to be divided into portions for representing multiple data values (e.g., portions corresponding to bits in a bit vector). The physical register may for example to be considered to comprise two halves, and availability of each half could be represented in a register allocation queue using a 2-bit vector, each bit corresponding to half of the physical register. However, if the given data value is larger than half of the physical register then it may not be possible to use the 2-bit vector to represent any remaining bits and hence in that example if the given data value is larger than half of a register it may not be possible to combine that value with any other values in a physical register, because it is not possible to indicate the availability in the register allocation queue. In this example, the second threshold corresponds to the size of half of the physical register. In some examples, step 712 may be skipped if the granularity of representing availability of bits in the physical registers is fine enough.

If the given data value exceeds the second threshold at step 712, then at step 714 it is determined that the given data value cannot be combined with any other data value and hence a new physical register is allocated to store the given data value. Hence, an available physical register is selected from the free list, the virtual register in the rename table 22 is replaced with the physical register identifier, and the physical register identifier is broadcast to any pending consumer instructions specifying the virtual register identifier.

If the given data value may be combined with at least one other data value in a physical register, then at step 716 the width of the given data value is compared to a number of entries in an allocation queue 28, each entry indicating availability within a corresponding physical register of the physical register file 14.

At step 718 it is determined whether the given data value fits within any of the physical registers indicated in the register allocation queue 28. If so, at step 720 a physical register is selected to store the given data value, and the allocation queue is updated to indicate that the given data value has now also been allocated to the selected physical register by reducing the number of available bits in that physical register. If this update results in there being below a threshold number of bits remaining, then the entry may be removed from the allocation queue. At step 722, the rename table 22 is updated to indicate the allocation of the given data value to the physical register. In particular, the virtual register identifier in the rename table 22 may be replaced with the physical register identifier of the selected physical register, in addition to information (e.g., in the format of a bit vector) indicating where the given data value is stored in the selected physical register.

If at step 718 it is determined that the given data value does not fit in any of the physical registers identified in the allocation queue 28, then at step 724 a new physical register is selected from the free list to store the given data value. The mapping in the rename table 22 is updated to indicate the newly allocated physical register, and the newly allocated physical register may also be added to the allocation queue 28 if there are any available bits which may be indicated to store data values from further instructions.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 8:
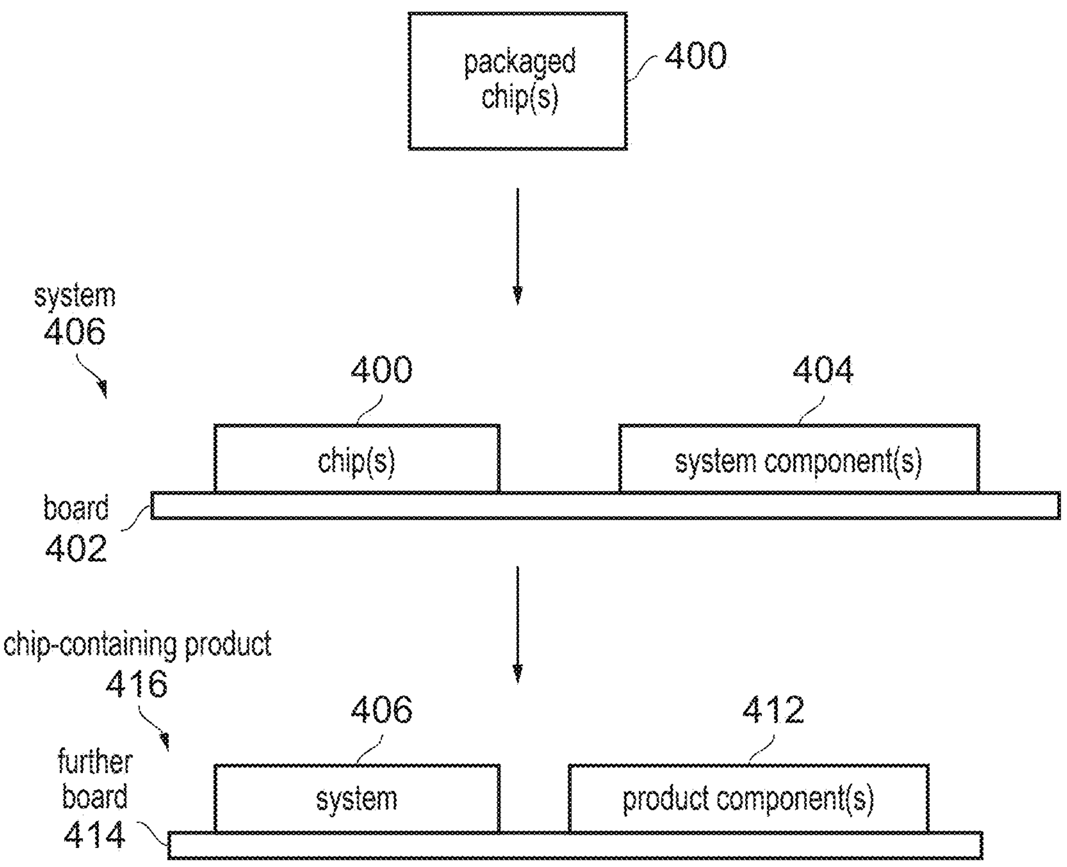
FIG. 8 illustrates a system and a chip-containing product.

As shown in FIG. 8, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. modular chips which, when combined, provide the functionality of a chip) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

1. An apparatus, comprising:
   execution circuitry configured to execute a given instruction to produce a given data value;
   value analysis circuitry configured to perform an analysis of the given data value produced by the execution circuitry to determine at least one property of the given data value; and
   register allocation circuitry configured to make a register allocation decision regarding storage of the given data value in a physical register file in dependence on the analysis of the given data value.
2. The apparatus according to clause 1, wherein the at least one property comprises a width of the given data value, the width indicating a number of bits required to represent the given data value produced by the execution circuitry; and
   the physical register allocation circuitry is configured to make the register allocation decision in dependence on the width of the given data value.
3. The apparatus according to clause 2, wherein the value analysis circuitry is configured to determine the width of the given data value based on a number of sign extension bits associated with the given data value.
4. The apparatus according to any of clauses 2 and 3, wherein:

the register allocation circuitry comprises a register rename table configured to store entries providing a mapping between a destination architectural register identifier specified by an instruction and a renamed register identifier; and in response to determining that the width of the given data value is below a given threshold, the register allocation circuitry is configured to store the given data value in an entry of the rename table corresponding to a given destination architectural register specified by the given instruction and skip storing the given data value in the physical register file.

5. The apparatus according to clause 4, wherein the register allocation circuitry is configured to store the given data value in a rename field of the register rename table provided for representing the renamed register identifier, and the register rename table is configured to provide a greater number of bits in the rename field than required to distinguish between a number of physical registers in the physical register file.

6. The apparatus according to any of clauses 4 and 5, wherein the register allocation circuitry is configured to indicate a virtual register identifier as the renamed register identifier for a given destination architectural register specified by the given instruction in advance of the given data value being produced by the execution circuitry; and responsive to a determination that the width of the given value is below the given threshold, the register allocation circuitry is configured to replace the virtual register identifier in the register rename table with the given data value.

7. The apparatus according to any of clauses 4 to 6, wherein in response to determining that the width of the given value is below the given threshold, the register allocation circuitry is configured to broadcast the given data value to at least one pending instruction via a communication channel;

wherein the communication channel is configured to support values having a greater number of bits than required to distinguish between a number of physical registers in the physical register file.

8. The apparatus according to any of clauses 4 and 5, wherein the register allocation circuitry is configured to allocate a given physical register for the given data value in advance of the given data value being produced by the execution circuitry; and responsive to a determination that the width of the given data value is below the given threshold, the register allocation circuitry is configured to release the given physical register.

9. The apparatus according to any of clauses 4 to 8, wherein responsive to a subsequent instruction later in program order than the given instruction, the subsequent instruction specifying a source architectural register which corresponds to the given destination architectural register, the register allocation circuitry is configured to provide the given data value from the rename table to the execution circuitry for executing the subsequent instruction.

10. The apparatus according to any of clauses 2 to 9, wherein the register allocation circuitry is configured to determine, based on the width of the given data value, whether to allocate the given data value to a physical register in combination with at least one further data value.

11. The apparatus according to clause 10, comprising at least one register allocation queue comprising a plurality of register allocation entries, a given register allocation entry indicating available bits within a set of one or more values allocated to a particular physical register, and the register allocation circuitry is configured to compare the width of the given data value to the given register allocation entry to determine whether the given data value can be allocated to the particular physical register in combination with the set of one or more values.

12. The apparatus according to clause 11, wherein at least one register allocation entry is configured to provide a bit vector indicating available bits within the particular physical register.

13. The apparatus according to any of clauses 10 to 12, wherein the register allocation circuitry is configured to allocate arbitrary combinations of data value widths to physical registers.

14. The apparatus according to any of clauses 10 to 13, wherein the register allocation circuitry is configured to allocate at least one data value to a physical register in combination with two or more further data values.

15. The apparatus according to any of clauses 10 to 14, wherein the register allocation circuitry is configured to permit the given data value to be allocated to a physical register in combination with a data value produced by an instruction capable of outputting a value having the same width as the physical register.

16. A system comprising:

the apparatus of any preceding clause, implemented in at least one packaged chip;

at least one system component; and a board, wherein the at least one packaged chip and the at least one system component are assembled on the board.

17. A chip-containing product comprising the system of clause 16, wherein the system is assembled on a further board with at least one other product component.

18. A non-transitory computer-readable medium storing computer-readable code for fabrication of an apparatus, comprising:

execution circuitry configured to execute a given instruction to produce a given data value;

value analysis circuitry configured to perform an analysis of the given data value produced by the execution circuitry to determine at least one property of the given data value; and register allocation circuitry configured to make a register allocation decision regarding storage of the given data value in a physical register file in dependence on the analysis of the given data value.

19. A method, comprising:

executing a given instruction to produce a given data value;

performing an analysis of the given data value to determine at least one property of the given data value; and making a register allocation decision regarding storage of the given data value in a physical register file in dependence on the analysis of the given data value.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus, comprising:

execution circuitry configured to execute a given instruction to produce a given data value;

value analysis circuitry configured to perform an analysis of the given data value produced by the execution circuitry to determine at least one property of the given data value; and register allocation circuitry configured to make a register allocation decision regarding storage of the given data value in a physical register file in dependence on the analysis of the given data value; wherein the at least one property comprises a width of the given data value, the width indicating a number of bits required to represent the given data value produced by the execution circuitry, and the physical register allocation circuitry is configured to make the register allocation decision in dependence on the width of the given data value;

the register allocation circuitry comprises a register rename table configured to store entries providing a mapping between a destination architectural register identifier specified by an instruction and a renamed register identifier; and in response to determining that the width of the given data value is below a given threshold, the register allocation circuitry is configured to store the given data value in an entry of the rename table corresponding to a given destination architectural register specified by the given instruction and skip storing the given data value in the physical register file.

2. The apparatus according to claim 1, wherein the value analysis circuitry is configured to determine the width of the given data value based on a number of sign extension bits associated with the given data value.

3. The apparatus according to claim 1, wherein the register allocation circuitry is configured to store the given data value in a rename field of the register rename table provided for representing the renamed register identifier, and the register rename table is configured to provide a greater number of bits in the rename field than required to distinguish between a number of physical registers in the physical register file.

4. The apparatus according to claim 1, wherein the register allocation circuitry is configured to indicate a virtual register identifier as the renamed register identifier for a given destination architectural register specified by the given instruction in advance of the given data value being produced by the execution circuitry; and responsive to a determination that the width of the given value is below the given threshold, the register allocation circuitry is configured to replace the virtual register identifier in the register rename table with the given data value.

5. The apparatus according to claim 1, wherein in response to determining that the width of the given value is below the given threshold, the register allocation circuitry is configured to broadcast the given data value to at least one pending instruction via a communication channel;

wherein the communication channel is configured to support values having a greater number of bits than required to distinguish between a number of physical registers in the physical register file.

6. The apparatus according to claim 1, wherein the register allocation circuitry is configured to allocate a given physical register for the given data value in advance of the given data value being produced by the execution circuitry; and responsive to a determination that the width of the given data value is below the given threshold, the register allocation circuitry is configured to release the given physical register.

7. The apparatus according to claim 1, wherein responsive to a subsequent instruction later in program order than the given instruction, the subsequent instruction specifying a source architectural register which corresponds to the given destination architectural register, the register allocation circuitry is configured to provide the given data value from the rename table to the execution circuitry for executing the subsequent instruction.

8. The apparatus according to claim 1, wherein the register allocation circuitry is configured to determine, based on the width of the given data value, whether to allocate the given data value to a physical register in combination with at least one further data value.

9. The apparatus according to claim 8, comprising at least one register allocation queue comprising a plurality of register allocation entries, a given register allocation entry indicating available bits within a set of one or more values allocated to a particular physical register, and the register allocation circuitry is configured to compare the width of the given data value to the given register allocation entry to determine whether the given data value can be allocated to the particular physical register in combination with the set of one or more values.

10. The apparatus according to claim 9, wherein at least one register allocation entry is configured to provide a bit vector indicating available bits within the particular physical register.

11. The apparatus according to claim 8, wherein the register allocation circuitry is configured to allocate arbitrary combinations of data value widths to physical registers.

12. The apparatus according to claim 8, wherein the register allocation circuitry is configured to allocate at least one data value to a physical register in combination with two or more further data values.

13. The apparatus according to claim 8, wherein the register allocation circuitry is configured to permit the given data value to be allocated to a physical register in combination with a data value produced by an instruction capable of outputting a value having the same width as the physical register.

14. A system comprising:

the apparatus of claim 1, implemented in at least one packaged chip;

at least one system component; and a board, wherein the at least one packaged chip and the at least one system component are assembled on the board.

15. A chip-containing product comprising the system of claim 14, wherein the system is assembled on a further board with at least one other product component.

16. A non-transitory computer-readable medium storing computer-readable code for fabrication of an apparatus, comprising:

execution circuitry configured to execute a given instruction to produce a given data value;

value analysis circuitry configured to perform an analysis of the given data value produced by the execution circuitry to determine at least one property of the given data value; and register allocation circuitry configured to make a register allocation decision regarding storage of the given data value in a physical register file in dependence on the analysis of the given data value; wherein the at least one property comprises a width of the given data value, the width indicating a number of bits required to represent the given data value produced by the execution circuitry, and the physical register allocation circuitry is configured to make the register allocation decision in dependence on the width of the given data value;

the register allocation circuitry comprises a register rename table configured to store entries providing a mapping between a destination architectural register identifier specified by an instruction and a renamed register identifier; and in response to determining that the width of the given data value is below a given threshold, the register allocation circuitry is configured to store the given data value in an entry of the rename table corresponding to a given destination architectural register specified by the given instruction and skip storing the given data value in the physical register file.

17. A method, comprising:

executing, with execution circuitry, a given instruction to produce a given data value;

performing, with value analysis circuitry, an analysis of the given data value to determine at least one property of the given data value; and making, with register allocation circuitry, a register allocation decision regarding storage of the given data value in a physical register file in dependence on the analysis of the given data value; wherein the at least one property comprises a width of the given data value, the width indicating a number of bits required to represent the given data value produced by the execution circuitry, and the physical register allocation circuitry is configured to make the register allocation decision in dependence on the width of the given data value;

the register allocation circuitry comprises a register rename table configured to store entries providing a mapping between a destination architectural register identifier specified by an instruction and a renamed register identifier; and the method comprises, in response to determining that the width of the given data value is below a given threshold, storing the given data value in an entry of the rename table corresponding to a given destination architectural register specified by the given instruction and skipping storing the given data value in the physical register file.

* * * * *